PROCESS FOR PREPARING A FOAMED CROSSLINKED ETHYLENE POLYMER

Filed Feb. 27, 1967 2 Sheets-Sheet 1

CALVIN J. BENNING
RONALD L. ADAMS
— INVENTORS

BY Charles L. Harness
ATTORNEY

Calvin J. Benning
Ronald L. Adams
INVENTORS 3,470,119

PROCESS FOR PREPARING A FOAMED CROSS-LINKED ETHYLENE POLYMER

Calvin J. Benning, Clarksville, and Ronald L. Adams, Sykesville, Md., assignors to W. R. Grace & Co., New York, N.Y., a corporation of Connecticut Continuation-in-part of applications Ser. No. 367,615, May 15, 1964, and Ser. No. 368,972, May 20, 1964. This application Feb. 27, 1967, Ser. No. 642,979
Int. Cl. C08f *47/10;* C08d *13/10*
U.S. Cl. 260—2.5 5 Claims

ABSTRACT OF THE DISCLOSURE

A process for preparing foamed crosslinked ethylene polymer which comprises heat shaping a uniform mixture of ethylene polymer, crosslinking agent and blowing agent at a temperature below the decomposition temperature of said agents, said agents decomposing at similar temperatures above the melting point of the polymer, and heating the shaped ethylene polymer mixture to the decomposition temperature of said agents in the substantial absence of atmospheric oxygen. The resulting foamed crosslinked ethylene polymer has low density, a substantially uniform cell structure and good tensile properties.

Figure 1:
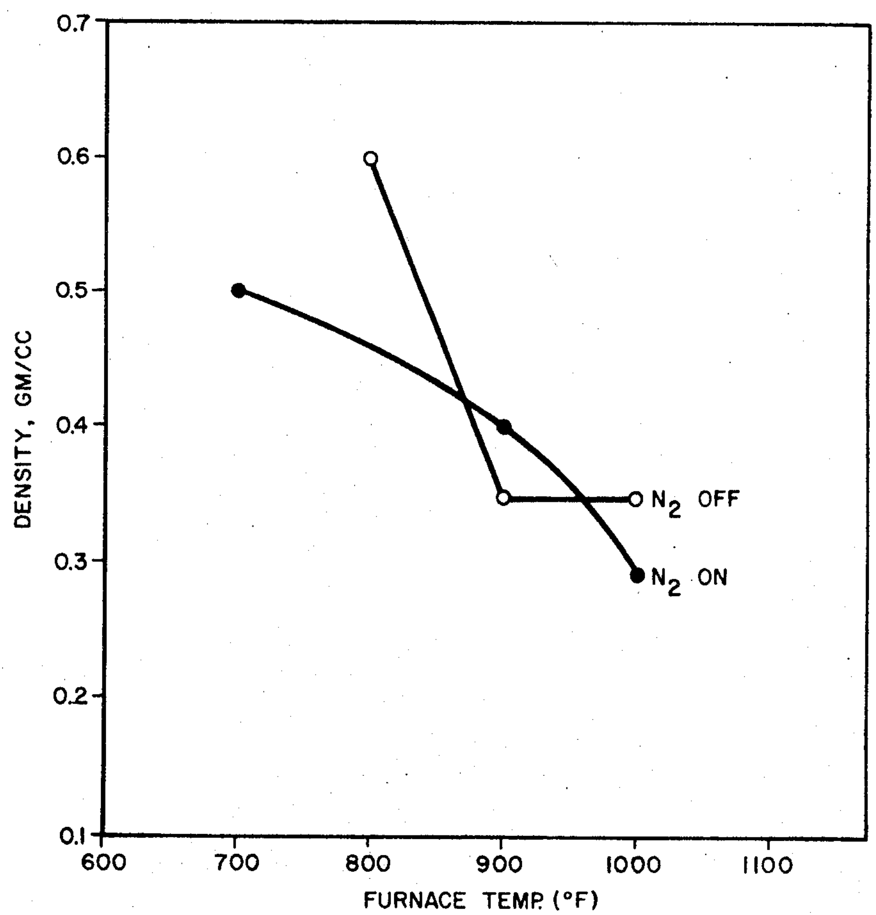

This application is a continuation-in-part of copending application Ser. No. 368,972 filed May 20, 1964, and copending application Ser. No. 367,615 filed May 15, 1964 and now both abandoned.

We have discovered that foamed ethylene polymers having low density and substantially uniform cell structure are produced by crosslinking and foaming the polymer at substantially the same time in the absence of oxygen. In the present process, the blowing agent has a decomposition temperature close to the decomposition temperature of the crosslinking agent. Under such conditions, the appearance and growth of bubbles in the polymer proceeds concomitantly with the crosslinking of the polymer. Since the gas nuclei which result from the decomposition of the blowing agent expand in the polymer which is also undergoing crosslinking, the rate of strength increase per unit area of polymer cross-section at temperatures near or above the crystalline transition temperature exceeds the loss of strength because of the reduction in the cross-sectional area of the cell walls. The total force required to enlarge a gas bubble in the wall surrounding the bubble increases as the cross-section of the cell wall decreases. The force of gas expansion thus acts on the thicker portions of polymer which have not yet developed maximum unit strength. Hence the cells, although they increase in size, can and do resist rupture. A uniform distribution of cells, each of reasonably uniform size and cell walls with a high degree of uniformity of wall thickness is the final result.

It is possible by the proper correlation of the amount of crosslinking agent and the amount of blowing agent, or by the addition to these agents of a temperature modifier, to provide a process which is largely self-regulating. This comes about because the cell walls become sufficiently strong to resist further expansion by the blowing gas. Accordingly, within limits, it is possible to adjust the cell size of the finished article by adjusting the mutual proportions of the crosslinking and blowing agents.

The crosslinking and blowing agents are added to the ethylene polymer and are uniformly mixed with the polymers at a temperature below their decomposition temperatures. Both agents decompose above the melting point of the polymer. The polymer mixture is then shaped or molded by conventional techniques at temperatures which are below the decomposition temperatures of the crosslinking agent and blowing agent. The shaped polymer is heated in the substantial absence of oxygen to the decomposition temperature of the crosslinking agent and blowing agent to expand and crosslink the polymer. During this heating, the shaped polymer is allowed to expand freely.

We have determined that oxygen seriously inhibits the crosslinking of the polymer and that absorption of oxygen from air by the polymer during the heating accompanying the crosslinking reaction, was responsible for a great variability in cell size and sometimes large holes and ruptured cells. By carrying out this heating step in the substantial absence of oxygen, a foam is produced wherein the cell walls do not rupture and the cell size throughout the foam is reasonably uniform.

The process of the present invention is operative when using high- and low-density homopolymers of ethylene and when mixtures of polymers are used. Foams also can be made from copolymers of ethylene, from previously grafted polymers of ethylene, and from mixtures of copolymers and grafted polymers with varying proportions of homopolymers. Additionally, the flexibility of the process is greatly increased by the fact that polymers of ethylene may, during the process, be grafted to polymers of other species while the mass is being foamed and crosslinked.

The products of the process range from rigid structural foams which are produced from foamed crosslinked high-density polyethylenes to soft and much more flexible foams which are produced when low-density polyethylenes, and particularly when grafted polymers and copolymers are employed.

Uniformity of cell size of the instant foam is also dependent upon the uniformity of distribution of the ingredients in the initial mixture. One suitable method of producing a uniform polymer mixture comprises dissolving the crosslinking agent in a solvent such as petroleum ether, which is inert to the ethylene polymer. Since the blowing agent is extremely insoluble, it is added to the solution and slurried in the solution to break up all the agglomerates. The slurry is then added with stirring to the finely divided polymer. The resulting polymer mixture is gradually heated to temperatures which will evaporate the solvent but will not decompose the blowing or the crosslinking agent. The polymer particles will be found to possess a uniform coating of both the crosslinking and blowing agents.

Another satisfactory method includes the dry blending of the polymer particles with the crosslinking and blowing agents in, for example, a twin shell blender, until a homogeneous blend is produced. The polyethylene, the crosslinking agent and the blowing agent can also be very thoroughly mixed by fluxing the mixture in a Banbury mixer at temperatures which are below the decomposition temperatures of both agents.

In the present invention, the extent to which a polymer is crosslinked, i.e. the extent to which its structure is transformed to a three dimensional structure, is determined by its gel content. Specifically, the crosslinked polymer, upon being immersed in a boiling liquid hydrocarbon, leaves an insoluble residue known as gel which is due to the crosslinked structure. The amount of gel is indicative of the extent to which the polymer is crosslinked.

The amount of blowing agent used in the instant process may range from about 1 to about 10 percent by weight of the polymer. Amounts of blowing agent outside this range generally do not produce desirable foams.

Representative of the blowing agents which may be used in the instant process is azobisformamide, p,p'-oxybis (benzenesulfonyl hydrazide), diazoaminobenzene, dinitrosopentamethylenetetramine, 4-nitrobenzene sulfonic acid hydrazine, β-naphthalene sulfonic acid hydrazide, and diphenyl-4,4'-di(sulfonyl azide).

Free-radical generating crosslinking agents which can be used in the process of the instant invention include organic peroxygen compounds and azonitriles. Suitable organic peroxygen compounds are diacyl peroxides, such as benzoyl and lauroyl peroxides: dialkyl peroxides such as diethyl peroxide, di(tert-butyl) peroxide or the like; some peracids and peresters, such as t-butyl perbenzoate and the like; and diaralkyl peroxides such as dicumyl peroxide and the like. Suitable azonitriles of equal stability can be used. Specific examples of suitable free-radical generating crosslinking agents and their half-lives are:

| Crosslinking agent— | Half-life |
|---|---|
| Di(tert-butyl) peroxide | 1 minute at 190° C. |
| Tert-butyl peracetate | 0.5 minute at 178° C. |
| Dicumyl peroxide | 0.6 minute at 182° C. |
| Diethyl peroxide | 1 minute at 198° C. |
| Di(tert-amyl) peroxide | 1 minute at 182° C. |
| Cyclohexyl peroxide | 0.5 minute at 226° C. |
| 2,5-dimethyl-2,5-di(tert-butyl-peroxy) hexane | 0.6 minute at 185° C. |
| 2,5-dimethyl-2,5-di(tert-butyl-peroxy)-3-hexyne | 0.6 minute at 192° C. |
| β-Hydroxyethylazo-δ-γ-dimethylvalero-nitrile | 2 minutes at 182° C. |

The crosslinking agent is used in amounts ranging from about 0.35 to about 2.0 percent by weight of the polymer. Amounts of crosslinking agent less than 0.35 percent by weight of the polymer do not crosslink the polymer sufficiently to impart the necessary strength to withstand the force of the gas produced by the decomposed blowing agent. On the other hand, amounts of crosslinking agent in excess of 2.0 percent by weight of the polymer may crosslink the polymer excessively and inhibit foaming. The specific concentration of crosslinking agent should be sufficient to crosslink the polymer, i.e. impart a gel content to the polymer, of about 20 to 80 percent by weight, to produce a stable foam.

Rods and tubes may be formed by extruders equipped with round and cored dies. Batts and sheets may be formed by extruders equipped with slit dies.

Figure 2:
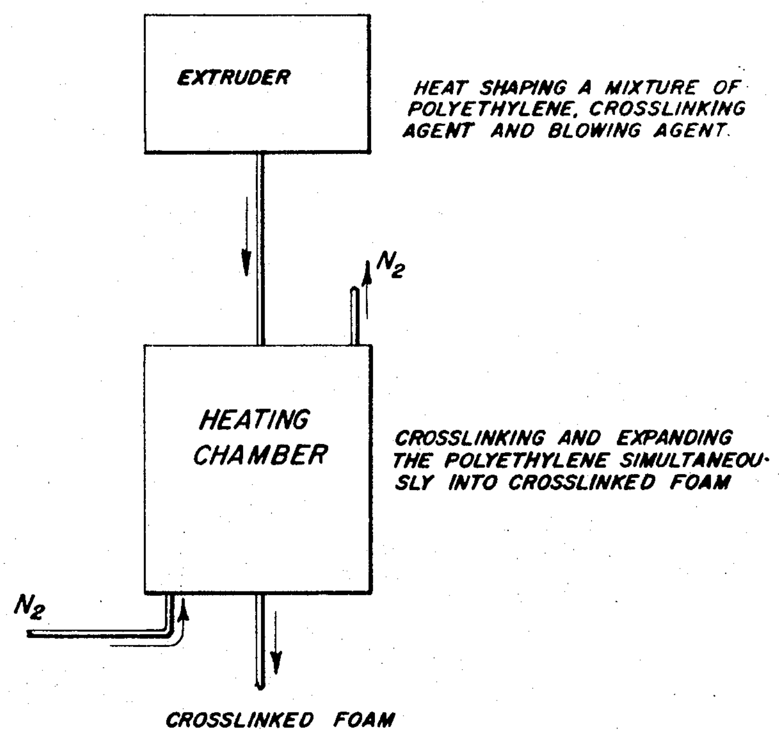

FIG. 2 is a schematic illustration of an arrangement of apparatus elements suitable for performing the process of this invention.

The invention is further illustrated by the following examples.

All parts and percentages used herein are by weight unless otherwise specified.

Tests used herein were made as follows unless otherwise noted:

Standard load melt index (SLMI): Measured according to ASTM D-1238-62T using condition E.

Density of unfoamed polymer: Measured according to ASTM D-1505-57T.

Tensile modulus p.s.i., tensile strength p.s.i. and percent elongation at failure were determined by cutting the films to ¼" sample strips, clamping the sample strip in the jaws (2" apart) of a tensile strength tester (Instron, Model TT, available from Instron Engineering Inc., Quincy, Mass.) and separating the jaws at a rate of 1" per minute at 23° C. and 50% relative humidity.

The percent gel content of the foamed polymer was measured by refluxing a weighed sample (approximately 0.5 g.) of the foamed polymer in a cellulose Soxhlet thimble in xylene (containing 0.3 weight percent 2,6-ditertiary-butyl-4-methyl-phenol) for 20 hours. The insoluble portion of the sample after drying was weighed to calculate percent gel as follows:

$$\text{Percent gel} = \frac{\text{weight insoluble sample}}{\text{total weight sample}} \times 100$$

Density of foamed polymer was determined by weighing a sample of foamed polymer and measuring its volume by the volume of water it displaced.

Cell size was determined by microscopic counting and measuring.

Flexural modulus: Measured according to ASTM D-790.

Compression deflection: Measured according to ASTM D-1621.

EXAMPLE I 1925 g. of a pulverized commercially available 0.95 density 95% ethylene 5% butene-1 copolymer were blended with 40 g. of zinc stearate, 15 g. of liquid 2,5-dimethyl-2,5-di(tert - butyl peroxy) - hexyne (Lupersol 130) and 20 g. of azobisformamide. Blending was carried out for 20 minutes at room temperature in a Paterson-Kelly twin shell blender to produce a homogeneous mixture. A conventional one-inch rotating screw extruder was used which was mounted on a platform 10 feet above floor level, and had a length-to-diameter ratio of 20-1, and a compression ratio of 4-1. No breaker plate or screen pack was used.

The sections of the extruder barrel were maintained respectively at 250° F., 260° F., 270° F., and 280° F., the lowest temperature being at the feed end. The mixture was extruded through an adapter and out of a ½ inch x 0.040 inch tubing die in a vertically downward direction.

About two inches below the die, a heated curing and expansion zone was arranged, consisting of 2 axially aligned, cylindrical, heavy-duty, electrically heated furnaces. The top furnace, i.e. furnace #1, was 26½ inches long with 3⅛ inch diameter heating chamber. The furnace was equipped with top, middle, and bottom heating zones: 8½ in., 12 in., and 3½ in. long, respectively.

Furnace #2 was placed immediately below furnace #1 and was provided with 3½ in. diameter heating chamber with a temperature controller located in the middle of its length. An annealing chamber was placed beneath furnace #2, the bore of which was 2⁷⁄₁₆ inches in diameter. Sparging rings for introducing an inert gas into the furnace and the annealing chamber were located at the bottom of the annealing chamber and at the top of furnace #1. The sparging gas was nitrogen. The furnaces and annealing chamber were flushed with nitrogen and a steady stream of nitrogen was maintained therethrough throughout the process.

To avoid overheating the extrusion die, a 1⅜ inch thick cooling ring was placed between the die and the top of furnace #1. A needle injector pipe, used to introduce a small amount of nitrogen inside the tube to prevent tube collapse, was placed in the extruder die. The die was fitted with a vent pipe to vent gaseous products formed by the decomposition of the crosslinking and blowing agents.

The extruded mixture was passed through furnace #1 where a substantial amount of foaming and crosslinking occurred. It was then passed through furnace #2 where foaming and crosslinking was completed. The hot foamed polymer was then passed through the annealing chamber where it was stabilized and then on to a quench bath where it solidified.

Four runs were made with furnace #1 at a temperature of 850° F. for the first run, 950° F. for the second run, 1000° F. for the third run and 1050° F. for the fourth run. The temperature of furnace #2 was maintained at 500° F. in all the runs. With each increase in temperature of furnace #1, the density of the resulting foam fell from 0.22 gm./cc. at 850° F. to 0.16 gm./cc. at 950° F., to 0.17 gm./cc. at 1000° F., to 0.14 gm./cc. at 1050° F. At 1050° F. some holes and voids appeared.

EXAMPLE II

To illustrate the effect of exposure to oxygen, Example I was repeated except that no nitrogen was used. The density of the resulting foamed polymer rod fell rapidly from 0.6 gm./cc. when furnace #1 had a temperature of 800° F. to approximately 0.35 gm./cc. at 900° F. As the furnace #1 temperature was raised from 900° F. to 1000° F., the foam density remained constant at 0.35 gm./cc. but at this point the foam collapsed. In contrast, when oxygen was excluded with an atmosphere of nitrogen, the resulting foam density of 0.5 gm./cc. when furnace #1 had a temperature of 700° F. fell regularly to 0.29 at a furnace temperature of 1000° F., but at this point the foam was still expanding.

FIGURE 1 graphically illustrates the effect when heating to crosslink and foam the polymer is carried out in an inert atmosphere of nitrogen and when it is carried out in air. The polymer used was a mixture of 80 parts of polyethylene, density 0.95, standard load melt index 0.5, and 20 parts of 67% ethylene-33% vinylacetate copolymer. Based on the total amount of polymer and copolymer, 3 weight percent of the blowing agent, azobisformamide, was used; and 0.5 weight percent of the crosslinking agent, 2,5-dimethyl-2,5 di-tertiary butyl-peroxyhexyne, was used. The process was carried out as set forth in Example I. The temperatures given in the figure are those of furnace #1. Furnace #2 was maintained at 500° F. With no blanket of nitrogen, the density fell very rapidly from 0.6 gm./cc. to approximately 0.33 gm./cc. and leveled off at this point as the furnace temperature rose from 900 to 1000° F. At 1000° F., slight scorching appears. The resulting foam was brown and not uniform. In contrast, when the polymer was foamed according to the present invention in the absence of oxygen, the density of the foam fell regularly from 0.5 gm./cc. to approximately 0.28 gm./cc., as the temperature rose from 700° to 1000° F. The resulting foam was an off white color and had smaller cells which were substantially uniform.

In Example III, the foamed polymers were prepared as set forth in Example I with the temperature of furnace #1 being 450° C.

EXAMPLE III

[Simultaneous grafting and foaming]

| | I | II |
|---|---|---|
| Polymers: | | |
| Polyethylene, density 0.96, SLMI 5.0, 75%, plus 25% of I or II | (1) | (1) |
| Formulation: | | |
| Percent azobisformamide | 3 | 3 |
| Percent 2,5-dimethyl-2,5 ditertiarybutylperoxy hexyne | 0.7 | 0.5 |
| Properties of foams: | | |
| Percent gel | 67 | 49 |
| Density | 0.11 | 0.20 |
| Flexural modulus | 4,098 | 3,348 |
| Compression deflection: | | |
| 5% | 12.5 | 43 |
| 10% | 41 | 55 |
| 25% | 59 | 68 |
| Tensile modulus | 2,941 | 3,000±250 |
| Tensile strength | 230 | 194 |
| Percent elong. at failure | 183 | 170 |

[1] 67% ethylene, 33% vinylacetate copolymer.

Temperature regulators are important to correlate the decomposition temperatures of the blowing agent and crosslining agent. Alkaline substances are effective, and of these, zinc stearate is preferred. 2% of zinc stearate added to a blowing agent such as azobisformamide will reduce the decomposition temperature of the azobisformamide to the decomposition temperature of 2,5-dimethyl-2,5 di-tertiary-butyl-peroxy-hexyne.

Polymers commonly known as "ethylene polymers" are suitable for use in this invention. They include both the high- and low-density homopolymers of ethylene, i.e. polyethylene made by the high-pressure process, or polyethylene made either by the well-known Zeigler process or with hexavalent chromia-silica-alumina catalyst. Grafted polymers of ethylene, i.e. grafts of ethylene polymers and maleic diesters may be used and also copolymers obtained by reacting ethylene with a co-monomer such as propylene; butene-1; 3-methyl butene-1; pentene-1; hexene-1; 1,3-butadiene and the like, as well as mixtures of such co-monomers.

Relatively simple shapes such as boards can be made by placing thoroughly blended, powdered, or granular ethylene polymer together with the crosslinking and blowing agents, between sheets or in a bag of an oxygen-impermeable substance and molding the polymer mixture between the platens of a heated press or in a cavity mold. As barrier materials, polytetrafluoroethylene (Teflon), and poly(ethyleneterephthalate) (Mylar) are suitable.

The polymer mixture is then molded to a flat, solid, plaque between the platens of a press heated to somewhat above the melt temperature of the polymer but below the decomposition temperatures of the crosslinking and blowing agents. Either press bearers or a cavity mold can be used to control the thickness of the plaque. With the covering still in place, the plaque is transferred to an oven heated to the decomposition temperature of the blowing and crosslinking agent where the plaque foams in all directions and becomes a "board" with a surprisingly uniform thickness. If the proportions of crosslinking and blowing agents are properly chosen, the cells will be round and too small to be easily distinguished by the unaided eye.

The covering film or envelope must be large enough to accommodate the final volume of the foam.

In the oven where foaming and simultaneous crosslinking occur, the presence of oxygen inhibits the crosslinking reaction, and the foam then has a very un-uniform structure. To prevent this occurrence, the impermeable coverings should be maintained in place and not be removed until the crosslinking and foaming action is completed.

EXAMPLE IV

| | Parts by weight |
|---|---|
| Copolymer of 95% ethylene and 5% butene-1 density 0.95, melt index 9—finely ground | 100 |
| 2,5-dimethyl-2,5 di(t-butyl-peroxy)hexyne (Lupersol 130) | 0.75 |
| Azobisformamide | 1 |
| Zinc stearate | 2.0 |

The ingredients were thoroughly blended in a V-blender. The granules were poured onto a "Mylar" sheet and roughly arranged in a circle. Then a covering sheet of Mylar was applied. The sandwich was placed in a platen press heated to 280° F. Bearers were used to adjust the thickness to 1/16 inch. Molding pressure was 2000 p.s.i. After 3 minutes the press was opened and the sandwich transferred to an oven maintained at 175° C. and held for 30 minutes, at the end of which time the foam was cooled to room temperature. The final density of the foam was 0.17 gm./cc. and its cell structure was uniform. It was crosslinked to 47% gel.

EXAMPLE V

Counter example

Example IV was followed except no barrier sheets were used. The resulting foam was very coarse, scorched, and brittle. The degree of crosslinking was lower than 1% since no gel was obtained on extraction. Final density of the foam was .352 gm./cc.

EXAMPLE VI

The formulation used in this example was the same as that set forth in Example IV except that polyethylene having a density of 0.95 and SLMI of 5 was used instead of the copolymer.

The procedure used in this example for preparing foam sample A1 was substantially the same as that set forth in Example IV except that the molding period was 6 minutes. Sample A2 was prepared in the same manner as sample A1 except that no Mylar sheet was used.

The sample A1 foam had a density of 0.21 g./cc. fine cells and 59% gel content. The sample A2 foam had a density of 0.352 g./cc., large cells, was brittle and had a 0% gel content.

What is claimed is:

1. A process of preparing foamed crosslinked ethylene polymer which comprises heat shaping a uniform mixture of ethylene polymer, crosslinking agent and blowing agent at a temperature below the decomposition temperature of said agents, said agents decomposing at similar temperatures above the melting point of the polymer, and heating the shaped mixture to the decomposing temperature of said agents in the substantial absence of atmospheric oxygen.

2. A process according to claim 1 wherein the crosslinking agent is selected from the group consisting of di(tert-butyl-peroxide, tert-butyl peracetate, dicumyl peroxide, diethyl peroxide, di(tert-amyl) peroxide, cyclohexyl peroxide, 2,5-dimethyl-2,5-di(tert-butyl peroxy) hexane, 2,5-dimethyl-2,5-di-(tert-butyl-peroxy)-3-hexyne and β-hydroxyethylazo-δ-γ-dimethyl-valeronitrile.

3. A process according to claim 1 wherein the crosslinking agent is present in an amount from about 0.35 to 2.0 percent by weight of the polymer.

4. A process according to claim 1 wherein the blowing agent is selected from the group consisting of azobisformamide, p,p'-oxy-bis (benzenesulfonyl hydrazide), diazoaminobenzene dinitrosopentamethylenetetramine, 4-nitro-benzene sulfonic acid hydrazine, β-naphthalene sulfonic acid hydrazide, diphenyl-4-4'-di(sulfonyl azide) and barium azodicarboxylate.

5. A process according to claim 1 where the blowing agent is present in an amount from about 1 to about 10 percent by weight of the polymer.

References Cited

UNITED STATES PATENTS

| | | | |
|---|---|---|---|
| 3,341,480 | 9/1967 | Field | 264—54 XR |
| 3,341,481 | 9/1967 | Palmer | 264—54 XR |
| 2,877,500 | 3/1959 | Rainer et al. | 264—22 |
| 3,098,831 | 7/1963 | Carr | 260—2.5 |
| 3,098,832 | 7/1963 | Pooley et al. | 260—2.5 |

OTHER REFERENCES

Chapiro, Adolphe: "Action des Rayons γ sur les Polymeres a l'Etat Solide," in Journal de Chime Physique, tome 52, No. 3, March 1955, pp. 246, 247, 252, 253 and partial translation.

Alexander, P.: "The Effect of Oxygen on the Changes Produced by Ionizing Radiations in Polymers" (letters to the editors), in Journal of Polymer Science, vol. 22, issue No. 101, November 1956, pp. 343–348.

Lanza, V. L.: "Effect of Radiation on Polyethylene," in Modern Plastics, vol. 34, No. 11, pp. 129–134.

Orlander, John W.: "A Guide to Radiation Equipment," in Modern Plastics, vol. 38, No. 10, June 1961, p. 109.

Chapiro, Adolphe: Radiation Chemistry of Polymeric Systems, New York, Interscience, 1962, pp. 423–424 (High Polymer Series).

PHILIP E. ANDERSON, Primary Examiner

U.S. Cl. X.R.

260—94.9; 264—54, 85